Jan. 8, 1957  L. P. CROSS  2,776,449
SAUSAGE LINKING MACHINE
Filed April 5, 1954  8 Sheets-Sheet 1

INVENTOR.
Lawrence P. Cross,
BY
Cromwell, Greist & Warden
Attys.

Jan. 8, 1957 L. P. CROSS 2,776,449
SAUSAGE LINKING MACHINE
Filed April 5 1954 8 Sheets-Sheet 3

INVENTOR.
Lawrence P. Cross,
BY
Cromwell, Greist & Warden
Attys

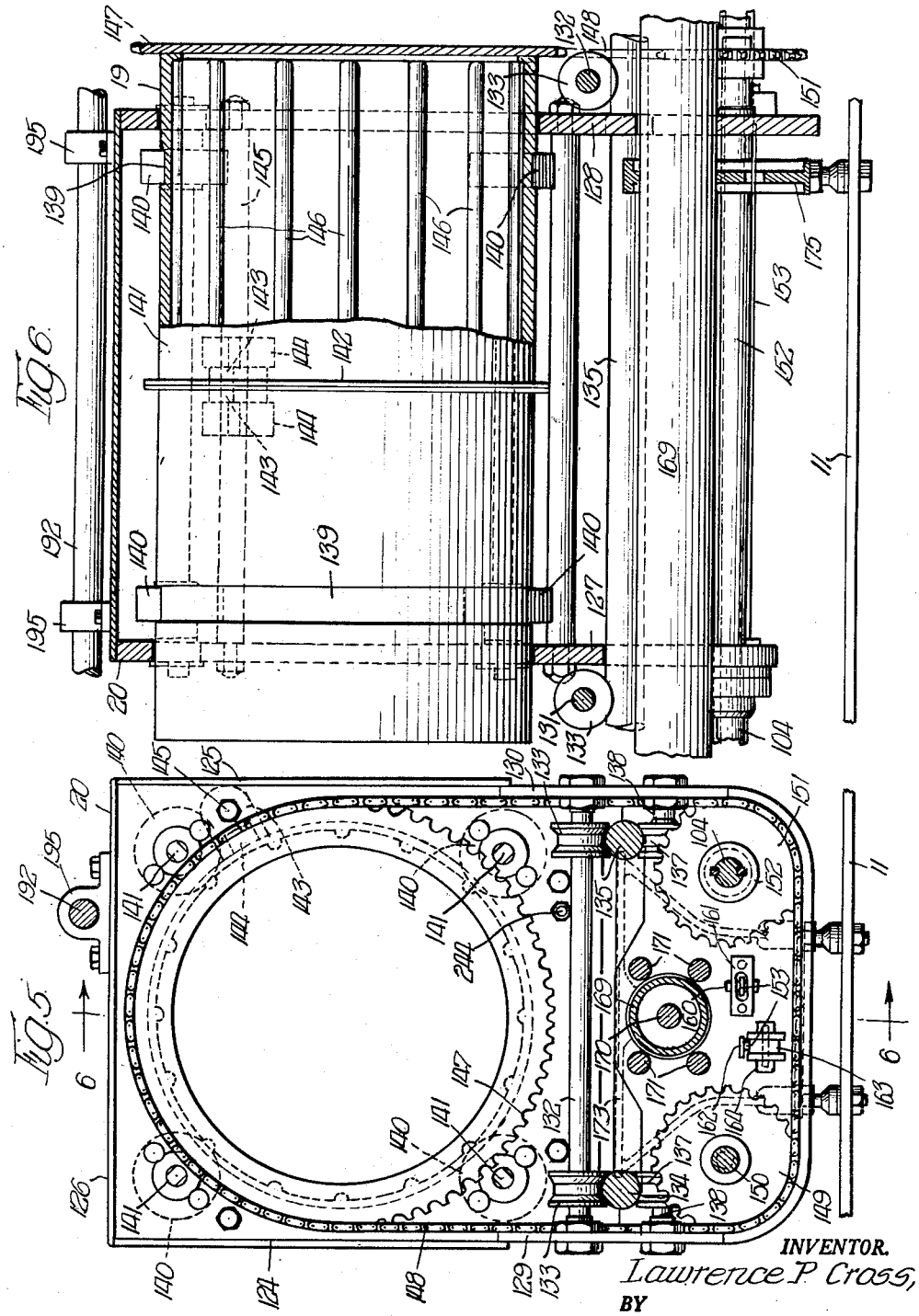

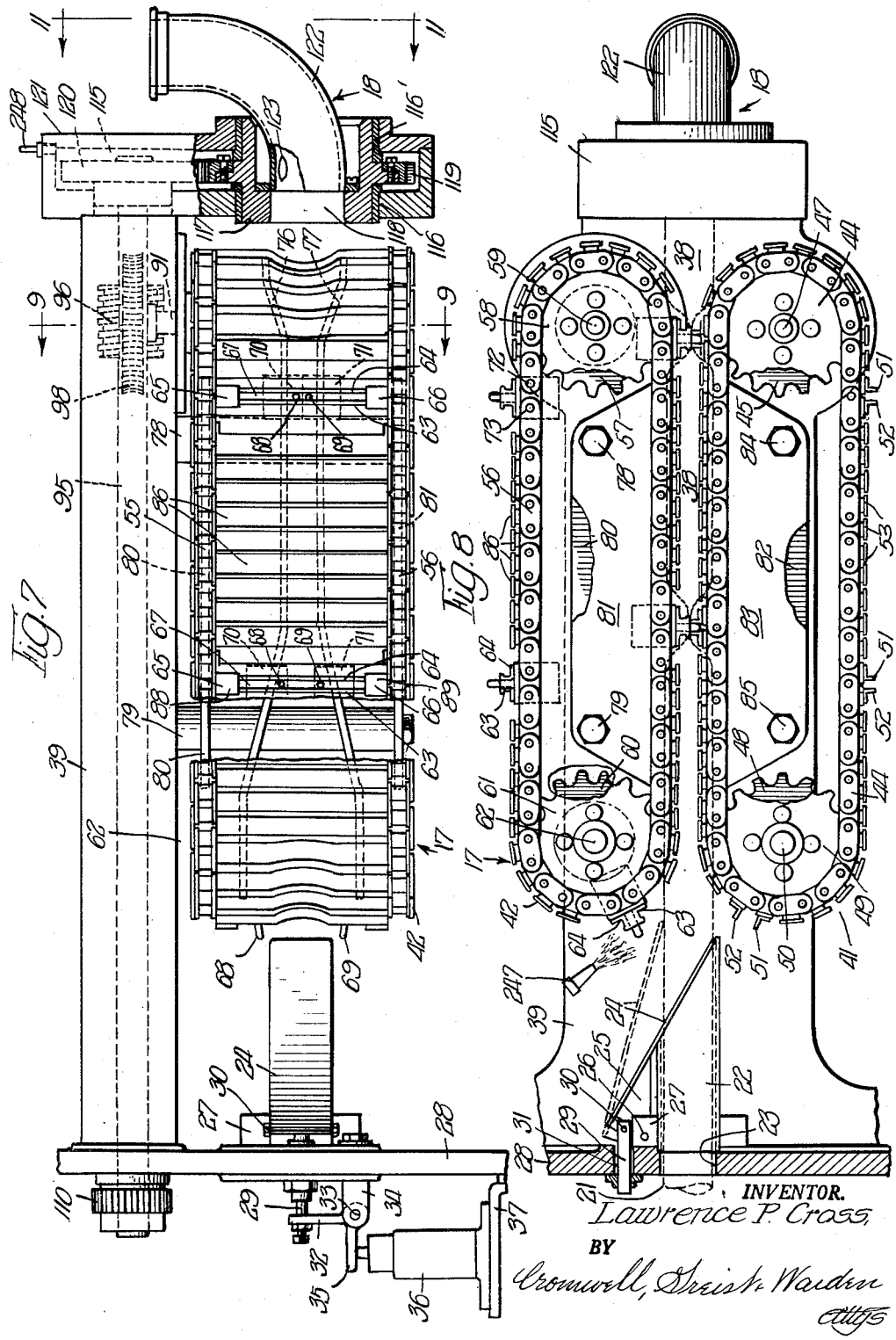

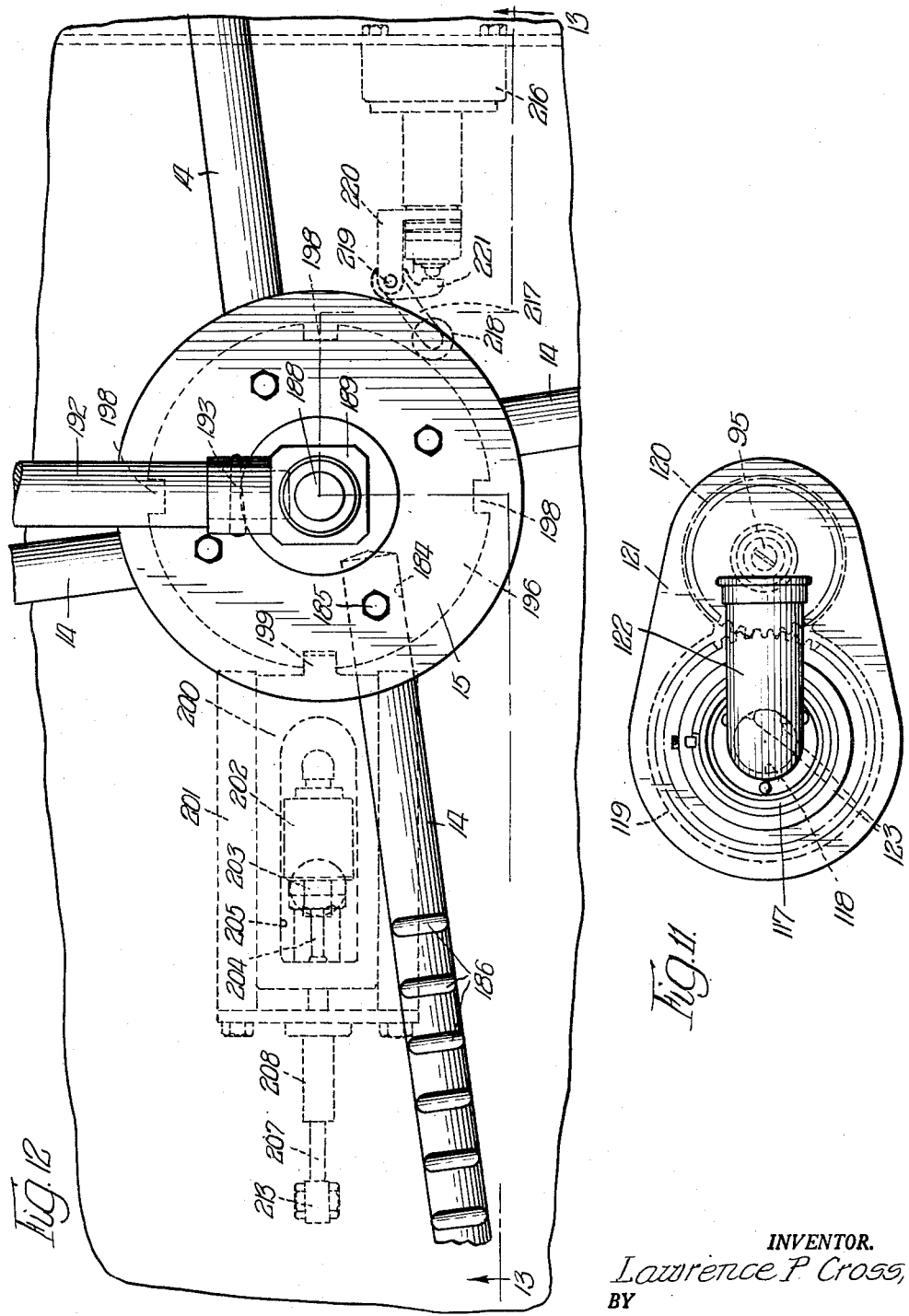

Jan. 8, 1957

L. P. CROSS 2,776,449

SAUSAGE LINKING MACHINE

Filed April 5, 1954

INVENTOR.
Lawrence P. Cross,
BY
Cromwell, Greist & Warden
Attys

Jan. 8, 1957 L. P. CROSS 2,776,449
SAUSAGE LINKING MACHINE
Filed April 5, 1954 8 Sheets-Sheet 8
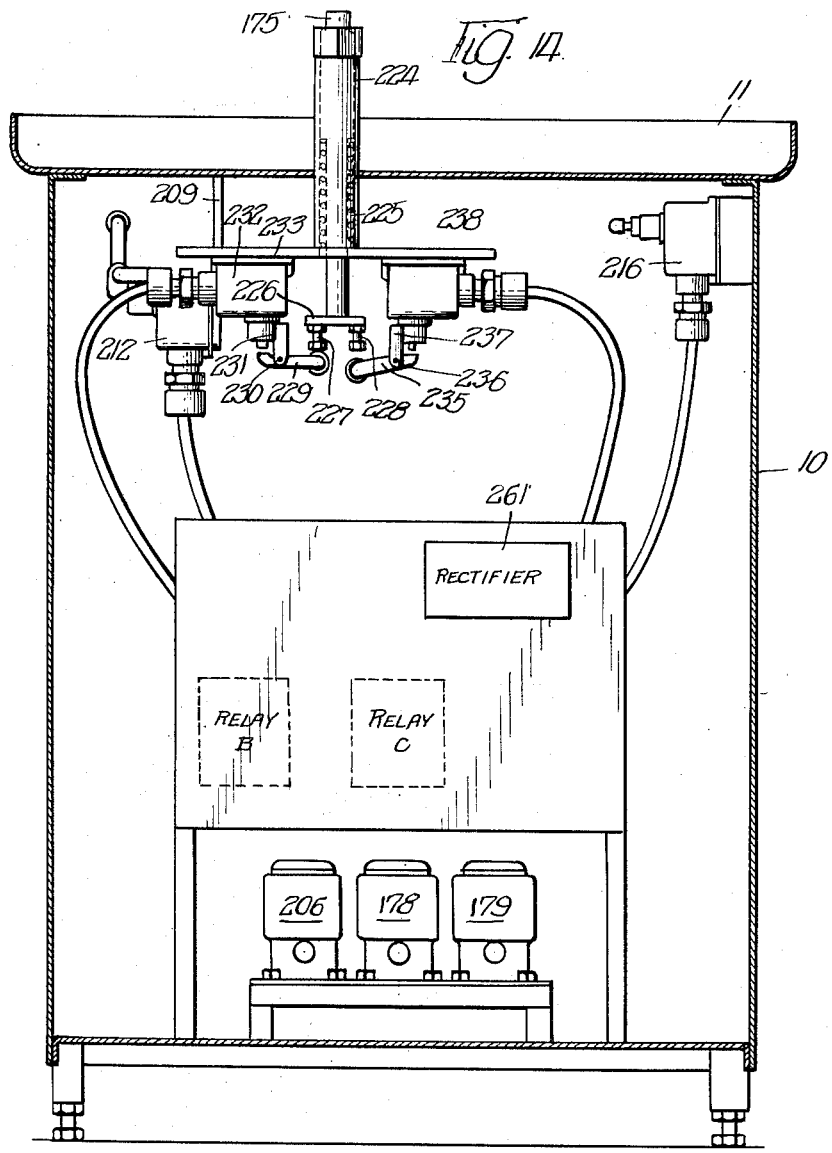
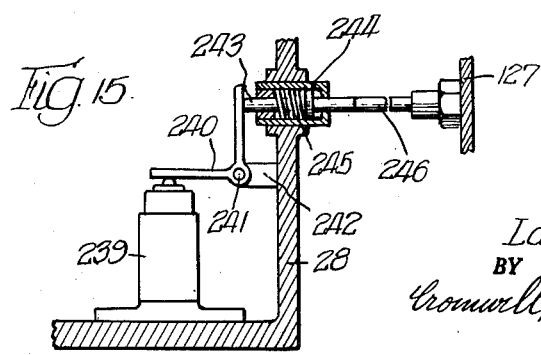
INVENTOR.
Lawrence P. Cross,
BY
Cromwell, Greist & Warden United States Patent Office 2,776,449
Patented Jan. 8, 1957

2,776,449

SAUSAGE LINKING MACHINE

Lawrence P. Cross, Valparaiso, Ind.

Application April 5, 1954, Serial No. 420,949

19 Claims. (Cl. 17—34)

This invention relates to the manufacture of products, such as sausage, of the character in which a length of filled, or stuffed casing is divided into relatively short link forming sections of uniform length and a twist is imparted in the casing between successive links.

It is a general object of the invention to provide a method and machine for the production of link sausages or similar products wherein a length of tubular casing, which is filled with the product, is divided into relatively short link forming sections of uniform length by constricting the casing at intervals and each successive link section is rotated about its longitudinal axis and in the same direction to provide a twist in the casing area between it and the next succeeding link section.

It is a more specific object of the invention to provide a linking machine which will automatically divide a length of tubular casing, which is filled with a pliable mass, into relatively short sections of uniform length, which will rotate each successive section to impart a twist in the casing between it and the next succeeding section, which will collect the twisted sections in coil-like fashion in a continuously rotating container as the twisting is completed and which will thereafter automatically deposit the coil of twisted sections on a supporting rod for removal from the container.

It is a further object of the invention to provide a linking machine which comprises in combination mechanism for continuously feeding a filled casing, mechanism for constricting the casing at predetermined intervals to divide the same into successive links, mechanism for rotating each successive link to impart a twist in the casing in the area between the links, mechanism for collecting the twisted links into a coil as they are delivered from the twisting mechanism and mechanism for moving the coil of links into position for deposit on an elongate supporting rod.

It is a still more specific object of the invention to provide a sausage linking machine which comprises in combination a mechanism for continuously feeding a filled sausage casing which includes a pair of cooperating continuously moving conveyors having casing constricting members thereon adapted to engage the casing from opposite sides and divide the same into successive individual links, a rotatable drum-like container for receiving the links from the conveyors, a cooperating mechanism for imparting a twist in the constricted casing area between the successive links and for depositing the twisted links in the rotating container, means for slowly moving the container relative to the twisting and depositing mechanism and along a lineal path as the links are deposited therein, and control mechanism for the container which is actuated by the movement of the casing to start and stop the rotation of the container whereby each length of casing is divided, twisted and deposited in coil formation within the container.

It is another object of the invention to provide a linking machine of the type described having link forming and accumulating mechanisms in which the link accumulating mechanism comprises a cylindrical container mounted for relatively rapid rotational movement and relatively slow linear movement away from the link forming mechanism, in combination with a mechanism for controlling the movement of the cylindrical container which is actuated by movement of the stuffed casing as it is advanced through the link forming mechanism whereby each length of casing is automatically divided, twisted and deposited in single coil formation within the container and the container is thereafter moved to a predetermined position for discharging the coil of links formed therein.

It is a still further object of the invention to provide a sausage linking machine of the type described having link forming mechanism including a cylindrical container, means for rapidly rotating the container about its axis and for simultaneously moving the container in the direction of its axis of rotation away from the link forming mechanism to cause the links to align themselves in single coil formation on the interior wall of the container, a series of bar members arranged adjacent the advancing end of the container and adapted to be successively positioned to extend into the container when the container has moved to the end of its lineal path and to receive thereon the coil of links when the container is brought to rest, together with automatic means actuated by movement of the stuffed casing into the link forming mechanism for controlling the movement of the container relative to the forming mechanism and the receiving bar members.

It is another object of the invention to provide a linking machine of the type described having link forming and accumulating mechanism in which the link accumulating mechanism comprises a cylindrical container mounted for relatively rapid rotational movement and for lineal movement relative to the link forming mechanism, a coil receiving or supporting bar mechanism, means for moving the cylindrical container in an axial path at a relatively low speed during the deposit of the links therein, and means for taking over the movement of the container upon completion of the twisting and accumulating operation which is operative to move the container with a relatively rapid rate of speed to the opposite end of its axial path and into position for discharge of the coil of links onto a prepositioned member of the supporting bar mechanism.

These and other objects and advantages of the invention will be apparent from a consideration of the link forming method and the linking machine for carrying out the same which is shown by way of illustration in the accompanying drawings, wherein:

Fig. 5 is a cross section on the line 4—4 of Fig. 1, to an enlarged scale;

Fig. 6 is a section taken on the line 6—6 of Fig. 5 with portions of the rotating cylinder shown in side elevation;

Fig. 7 is a partial plan view, to an enlarged scale and with portions broken away, showing the casing dividing mechanism;

Fig. 8 is a partial side elevation, to an enlarged scale and with portions broken away, showing the casing dividing mechanism;

Fig. 9 is a section taken on the line 9—9 of Fig. 7;

Fig. 10 is a detail view, to an enlarged scale, at the entrance end of the dividing mechanism;

Fig. 11 is an elevation of the twisting head, with the view taken on the line indicated at 11—11 on Fig. 7;

Fig. 12 is a partial plan view, to an enlarged scale, of the supporting bar structure at the discharge end of the machine;

Fig. 14 is a transverse section taken on the line 14—14 of Fig. 1, to an enlarged scale, and with portions omitted;

Fig. 15 is a detail section taken on the line 15—15 of Fig. 3, to an enlarged scale; and Fig. 16 is a schematic diagram showing the control mechanism for the machine.

Figure 1:
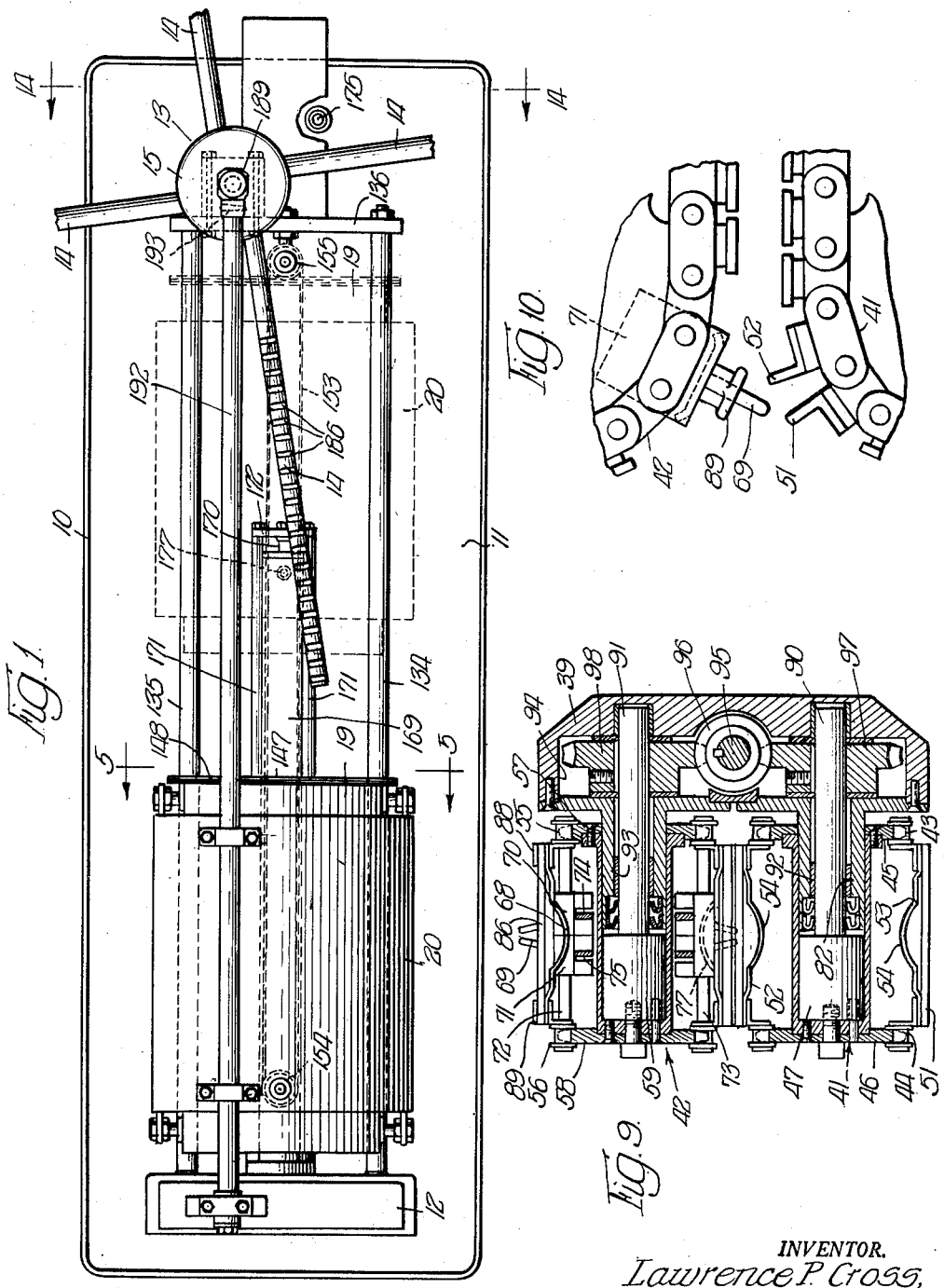
Fig. 1 is a plan view of a machine for dividing a filled casing, for twisting each successive link and for accumulating the links in coil formation, which machine embodies the principal features of the invention, with portions of the machine being broken away.

Referring to the drawings there is shown a linking machine constructed in accordance with the principles of the invention which will divide a continuous length of a casing stuffed with sausage meat, or the like, into a plurality of link forming sections of predetermined length, which will successively rotate each link relative to the remainder of the filled casing to impart one or more twists between it and the next succeeding link, which will cause the twisted links to arrange themselves in coil-like fashion around the interior periphery of a rotating drum and which will deposit the coiled links on a receiving bar for removal from the machine.

The present mechanism is related to the mechanism disclosed in applicant's copending application Serial No. 207,021, filed January 28, 1951, now Patent No. 2,697,850, issued December 28, 1954, and constitutes a further development of the same.

Figure 2:
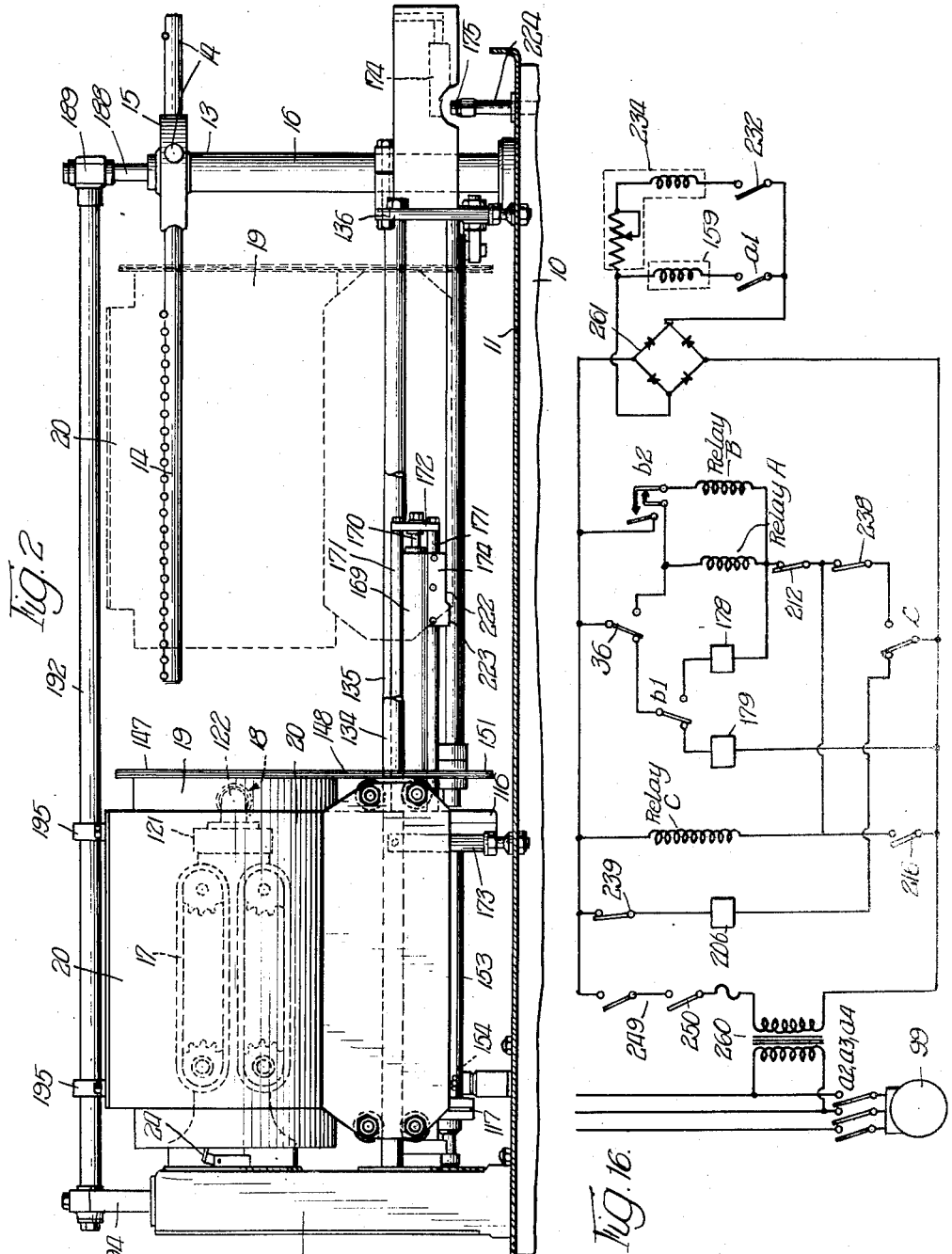
Fig. 2 is a side elevation of the linking machine, with portions thereof broken away.

The illustrated machine (Figs. 1 and 2) comprises a supporting frame structure which includes a longitudinally extending base cabinet 10 having a table-like top member 11 which forms a support for the major portion of the operating mechanism. A relatively shallow generally rectangular upright end cabinet or casing 12 extends above the support member 11 at one end of the base cabinet 10 while at the other end of the base 10 there is provided a capstan or turret arrangement 13 which supports a plurality of horizontally extending link receiving and supporting bars 14 which are spaced above the top member 11 and each of which is attached at one end to a hub forming member 15 rotatably mounted on an upright post formation 16. The upright end casing 12 has mounted on its inner face in forwardly projecting relation a conveyor carried mechanism indicated at 17 (Figs. 2, 7 and 8) for guiding and advancing a filled sausage casing along a horizontal path which simultaneously dividing the casing into link forming sections of predetermined length. A twisting head 18 is supported at the end of the casing dividing mechanism 17 which delivers the successive links to a rotatable link accumulation cylinder 19. The link accumulating cylinder 19 is rotatably mounted in a carriage 20 which, in turn, is mounted for longitudinal reciprocable movement between the upright end support 12 and the vertical post 16 at the other end of the machine. The cylinder 19 is moved in a lineal path toward the post 16 from an initial position (Figs. 1 and 2) where it encompasses the dividing mechanism 17 and the twisting head 18 to a final discharge position, indicated in dotted lines in Figs. 1 and 2, where it extends over one of the elongate supporting bars 14, while the twisted links are accumulated in a coil therein, the supporting bars 14 being rotated on the post 16 to position successive bars to extend into the revolving cylinder 19 whereby when the carriage 20 reaches the end of its movement and is brought to rest the coil of links accumulated therein is deposited on a bar 14.

The filled casing 21 (Figs. 7 and 8) is fed to the divider mechanism 17 through a guideway forming chute or tube 22 which extends through an aperture 23 in the end housing 12 and projects forwardly of the latter. The guide tube 22 has associated therewith a control mechanism which comprises a plate 24 having flanges 25 at its trailing end which are pivoted at 26 to a bracket 27 on the inner face plate 28 of the housing 12. The plate 24 extends over the diagonal forward end of the feed tube 22 in the inoperative position and is swung upwardly about its pivot 26 by passage of the filled casing 21. A pin 29 is pivotally connected at 30 to the flanged end of the plate 24 and projects through an aperture 31 in the plate 28. The other end of the pin 29 engages one arm 32 of a small bell crank which is pivoted at 33 to a bracket 34 mounted on the support plate 28. The other arm 35 of the bell crank engages with the operating button of a feed controlled switch 36 which is mounted by means of a bracket 37 on the support plate 28 and which forms part of the electrical system for controlling the operation of the power drive for the divider mechanism 17, the twisting head 18 and the link receiving cylinder 19.

The casing feeding and dividing mechanism 17 which initially feeds the filled casing 21 in a horizontal path and which divides the same into link forming sections 38 is supported on a horizontal drive shaft housing 39 which extends forwardly of the end support plate 28 and which forms a supporting bracket for the mechanism 17. The housing 39, extends in a horizontal spaced relation above the base top plate 11 and also supports at its forward end the twisting head 18.

The casing feeding and dividing mechanism 17 comprises a pair of cooperating elongate endless conveyors 41 and 42 (Figs. 7 to 9) which are supported in vertically spaced horizontally extending relation on the support housing 39. The lowermost conveyor 41 comprises inner and outer spaced endless chains 43 and 44 which are supported at the forward end on inner and outer sprockets 45 and 46 arranged in axially spaced relation on a driven shaft 47. At the other end the conveyor chains 43 and 44 are supported on inner and outer idler sprockets 48 and 49 which are arranged in axially spaced relation on outwardly projecting idler shaft 50. The shafts 47 and 50 are journalled in suitable bearings in the support housing 39. The chains 43 and 44 are connected at longitudinally spaced intervals by transversely extending pairs of casing engaging and constricting bar members 51 and 52. The transverse bar members 51 and 52 of each pair are arranged in spaced relation longitudinally of the chain and the distance between each pair of these members and the next adjacent pair thereof corresponds to the desired length of link. The constricting bars 51 and 52 are angular in cross section and the opposite ends of each bar are attached to transversely aligned links of the chains 43 and 44. The bars 51 and 52 are arranged on adjoining links of the conveyor chains (Fig. 10) with outwardly projecting confronting flanges which are slightly spaced and in parallel relation while the bars are moved along the straight runs of the chains but which will spread apart at an angle to each other as the bars pass around the end of the idler sprockets 48 and 49 and the driven sprockets 45 and 56. A plurality of relatively narrow transversely extending bar or plate members 53 are arranged between the pairs of casing constricting bars 51 and 52, with each of the plate members 53 having an inwardly bowed central portion 54 which is adapted to engage with and lightly grip the filled casing as it advances between the opposed runs of the conveyors 41 and 42.

The uppermost conveyor 42 is of the same general construction as the lowermost conveyor 41 and comprises spaced inner and outer endless chains 55 and 56 which are supported at the forward end on inner and outer driven sprockets 57 and 58, the latter being axially spaced on the driven shaft 59. At the other end the chains 55 and 56 are carried on inner and outer sprockets 60 and 61 which are axially spaced on the idler shaft 62. Pairs of casing engaging and constricting cross bars 63 and 64 are arranged on the chains 55 and 56, at longitudinally spaced intervals, which cross bars 63 and 64 are angular in cross section and are arranged with outwardly projecting confronting flanges positioned in spaced relation, the ends of the bars 63 and 64 being mounted on oppositely disposed chain links by means of brackets 65 and 66. The cross bars 63 and 64 align with the cross bars 51 and 52 on the conveyor 41, as cooperating pairs of these bars pass along the straight portion of the path which extends between the conveyors 41 and 42. The space between the confronting flanges of the cross bars 63 and 64 forms a transverse guideway 67 which receives in transverse sliding relation therein outwardly projecting casing constricting pins 68 and 69 which are carried on block members 70 and 71, each of which is suitably apertured to receive the transversely extending rods 72 and 73 which are arranged beneath the cross bars 63 and 64 in parallel relation thereto and the ends of which form the pivots for connecting the chain links, on which the bars 63 and 64 are mounted, on the adjoining links of the chains 55 and 56. The movable, pin carrying block members 70 and 71 are slotted at 74 and 75 on their inner or bottom faces to provide a cam track for receiving cam plates 76 and 77 which control the transverse movement of the block members 70 and 71 and the casing constricting pins 68 and 69 carried thereon.

The cam plates 76 and 77 are mounted in spaced relation outwardly of the support bracket 39 by means of a pair of spaced mounting bolts 78 and 79 having suitably formed spacer sleeves thereon for positioning the cam plates 76 and 77 in proper spaced relation as shown in Fig. 7. The cam forming edges of the plates 76 and 77 extend parallel with the inner edges of the chains, the plates being suitably apertured at the ends to accommodate the shaft formations 59 and 62 which carry the supporting sprockets for the chains, so that the block members 70 and 71 are at all times under the control of the cam plates 76 and 77. The cam plate supporting bolts 78 and 79 also carry inner and outer guide plates 80 and 81 which support the rollers or pins connecting the links of the chains along the straight portions of their path of movement between the conveyors 41 and 42. Similar inner and outer guide plates 82 and 83 are provided on the lower conveyor 41 which are supported on spaced mounting bolts 84 and 85.

With the arrangement of the conveyor members and the casing constricting members, as described, the casing 21 is first engaged on opposite sides by the cross bar members 51, 52 and 63, 64 as the casing advances between the opposed runs of the conveyors 41 and 42, the cross bars 51, 52 opening up or spreading apart as they approach the cross bars 63, 64 in order to receive between them the constricting pins 68, 69 which thereafter are moved toward the casing on the two sides at right angles to the engagement thereof by the cross bars 51, 52 and 63, 64. The conveyor chains are held or guided in a straight path by the guide plates 80, 81 and 82, 83 and the cross bars 51, 52 are held slightly spaced from the cross bars 63, 64 by the projecting outer portions 88, 89 of the end supporting brackets 65, 66 for the cross bars 63, 64 which extend beyond the outer edges of the latter and engage with the opposed outer edges of the cross bars 51, 52.

The driven shafts 47 and 59 which carry the sprockets 43, 44 and 55, 56 are provided with reduced portions 90, 91 which are journaled in bearing formations 92, 93 extending laterally of the supporting bracket 39. The bearing formations 92, 93 also support in rotatable relation thereon the inner portions of the conveyor end sprockets as shown in Fig. 9. The bearing formations 92, 93 are attached to the inner face of the housing 39 and the latter is provided with an internal compartment 94 in which a longitudinally extending drive shaft 95 is supported. The drive shaft 95 is connected in driving relation with the conveyor drive shafts 90, 91 by means of a pinion 96 on the shaft 95 and gears 97, 98, which are mounted on the ends of the shaft portions 90 and 91, respectively, the latter extending into the compartment 94 provided in the support housing 39. The horizontal drive shaft 95 is journaled in suitable bearings in the support housing 39 and extends at one end into the vertically extending end support housing 12.

Figure 3:
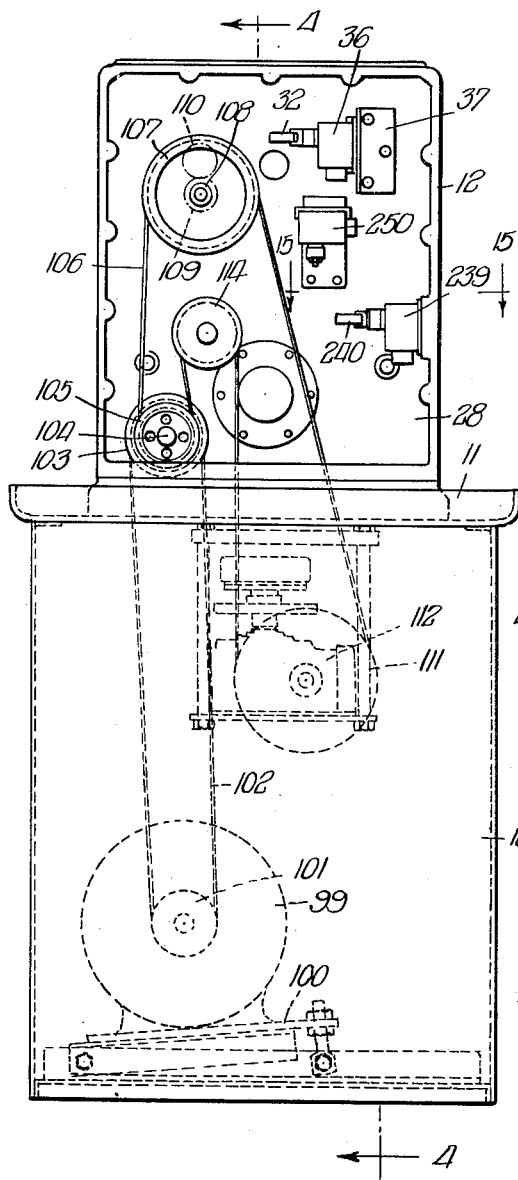
Fig. 3 is an end elevation of the linking machine, with the end cover plate removed, and to an enlarged scale.
Figure 4:
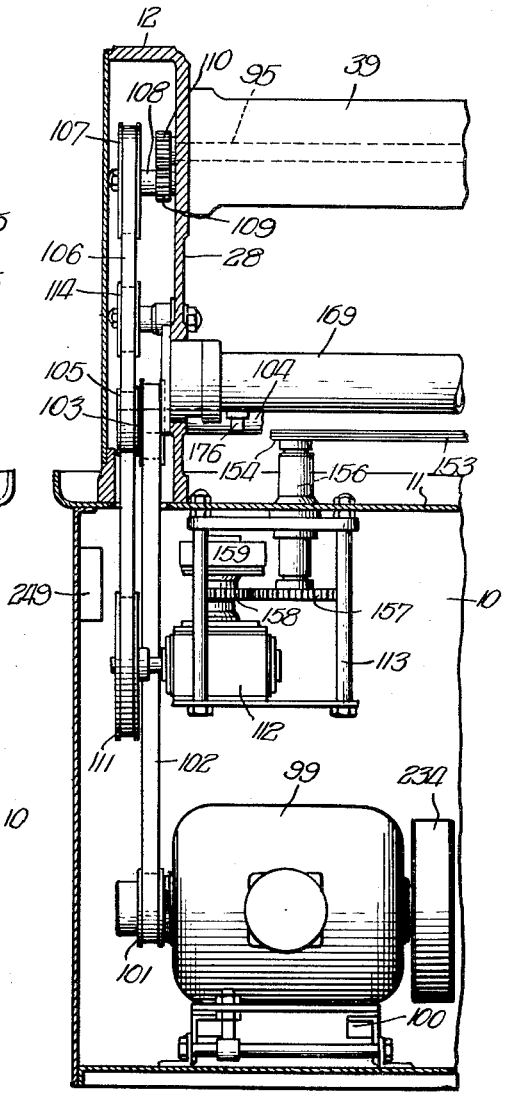
Fig. 4 is a cross section taken on the line 4—4 of Fig. 3.

The horizontal drive shaft 95 is driven from the motor 99 (Figs. 3 and 4) which is mounted on a suitable support 100 in the base cabinet 10 and which is provided with a drive pulley 101 connected by a drive belt 102 to a pulley 103 on shaft 104. The shaft 104 is journaled in the frame plate 28 and provided with an end pulley 105 which drives a belt 106. The drive belt 106 engages a pulley 107 on a stub shaft 108 which carries a pinion 109 in driving engagement with a pinion 110 on the end of the horizontal drive shaft 95. The drive belt 106 also engages a pulley 111 on a change speed device 112, the latter being mounted on a suitable support frame 113 in the base cabinet 10 and being connected in driving relation with the carriage 20 in a manner which will be subsequently described. An idler roller 114 is suitably mounted in the casing 12 for engaging the drive belt 106 to adjust the tension in the belt.

The drive shaft 95 extends forwardly of the end housing 12 in the housing 39 and terminates in a transversely extending end housing 115 (Figs. 7, 8 and 11) on the forward end thereof. The transverse housing 115 supports the twisting head 18 which is also driven by the horizontal drive shaft 95. The support housing 115 extends transversely of the longitudinal housing 39 to a position at the forward or delivery end of the casing dividing conveyors 41 and 42 where it is apertured at 116 to receive in rotatable relation therein a throat ring 117 having a central aperture 118 which is aligned with the path of advancing movement of the casing 21 as it is advanced by the conveyors 41 and 42. The throat ring 118 is supported by a bearing 116' and carries a ring gear 119 which is connected in driving relation with the drive shaft 95 by a gear or pinion 120 on the end of the shaft 95. The end housing or bracket 115 is recessed to receive the gears 119 and 120 and the outer wall is in the form of a cover plate 121. The throat ring 117 extends through the main portion of the housing 115 and the cover plate 121 and carries a hollow horn-like distributing member 122 which is secured thereto and forms with the aperture 118 an angularly directed passageway which is adapted to receive the link forming sections 38 as they are delivered from the conveyors 41 and 42 and change the direction of advancing movement of the same. The horn 122 is provided adjacent the throat ring aperture 118 with a pair of circumferentially spaced longitudinally extending and radially inwardly directed protuberances 123 which form corrugations, ridges, or groove formations tending to engage the sausage and restrain it against relative rotation with respect to the distributing horn 122.

As the link forming sections 38 move through the passageway formed by the throat aperture 118 and horn 122 the link sections 38 are caused to rotate about their longitudinal axis. This axial rotation imparts one or more twists in the restricted casing area between the trailing end of the link section 38 which is in the passageway and the remainder of the casing 21 which is passing between the conveyors 41 and 42. The twisting begins when the advancing link section 38 enters the rapidly rotating throat member 117 and is effective upon the connecting casing area between the link section 38 entering the throat aperture 118 and the next succeeding link section 38. The distributing horn 122 guides the successive links 38 in a radially outwardly directed path. As the twisted links 38 emerge from horn 122 in a connected string they are positioned in coil-like formation in the rapidly revolving cylinder 19. The speed of operation of the casing dividing conveyors 41 and 42, the rotation of the throat ring 117 and the rotation of the cylinder 19 are synchronized so that the desired number of twists are obtained in each connecting casing area. The mechanisms are operated at relatively high speed to take advantage of the effect of centrifugal force in forming the twists and depositing the completed links in a single coil in the accumulating cylinder 19.

The carriage 20 (Figs. 1, 2, 5 and 6) which carries the rotatable accumulating cylinder 19 consists of an outer casing or frame of generally rectangular cross section having depending side walls 124 and 125 which are connected at the top by a top wall 126 and at the ends by transverse end walls 127 and 128. The side walls 124 and 125 are provided at their bottom edges with extension plates 129 and 130 which are connected at opposite ends by longitudinally spaced transversely extending shafts 131 and 132 which carry support rollers 133 of identical construction at their opposite ends. The support rollers 133 engage with or ride on longitudinally extending laterally spaced support rails or bars 134 and 135 which extend above the base member 11 from the inner face plate 28 of the upright end support casing 12 to a vertically positioned cross bracket plate 136 (Figs. 1 and 2) secured adjacent the base of the end post 16 at the discharge end of the machine. The rollers 133 support the carriage 20 on the rails 134 and 135 for movement in the longitudinal direction of the machine and cooperating guard rollers 137 are provided on stub shafts 138 extending inwardly of the plates 129 and 130 beneath the guide rails 134 and 135 to insure the carriage 20 will remain on the rails.

The link accumulating cylinder 19 comprises a two section tubular member having longitudinally spaced track forming peripheral grooves 139 on the external surface for receiving roller bearing members 140 which are longitudinally spaced on shafts 141 extending between the end plates 127 and 128 and spaced around the periphery of the cylinder 19 for supporting the cylinder in rotatable relation in the carriage 20. The cylinder 19 is provided with a central peripheral flange 142 which extends between a pair of block members 143 mounted in brackets 144 on an end plate connecting brace rod 145 in the carriage 20. The block members 143 cooperate with the flange 142 to hold the cylinder 19 against longitudinal movement relative to the carriage 20. The cylinder or drum 19 is provided on its internal surface with a series of circumferentially spaced longitudinally extending rib formations 146 which tend to hold the links against rotation relative to the cylinder wall as they are deposited on the same while the cylinder is rotating at a high rate of speed. The drive means for rotating the cylinder 19 is at the forward or discharge end of the cylinder 19 where a sprocket 147 is secured to the peripheral edge and driven by a chain 148. The chain 148 passes over an idler sprocket 149 mounted on a suitable stub shaft 150 extending from the end plate 128 and a driven sprocket 151. The driven sprocket 151 is mounted on the end of a tubular member 152 which extends between and is journaled in the carriage end plates 127 and 128 and which has a splined connection with the driven shaft 104, the latter extending through the tube member 152 so that the sprocket 151 is rotated by rotation of the shaft 104 while the carriage 20 moves along the shaft 104 in the axial direction of the latter. The shaft 104 preferably extends to and is journaled at its outer end in the cross support plate 136.

The carriage 20 is initially moved in its lineal path along the guide rods 134 and 135 by means of a traveling endless chain 153. The chain 153 is mounted on a drive sprocket 154 located adjacent the upright end support casing 12 (Figs. 1, 2 and 4) and an idler sprocket 155 mounted on the cross frame member 136 at the other end of the machine. The drive sprocket 154 is secured on the upper end of a vertically positioned driven shaft 156 which is journaled in the support plate 11 and which is provided with a gear 157 on its lower end. The gear 157 engages in driving relation with an output gear 158 on the change speed device 112, the latter being provided with an electromagnetic clutch device 159 to control the operation of the chain 153.

The carriage 20 is connected to the chain 153 by means of a connecting pin 160 which extends across the aperture in a suitably apertured connecting plate 161 mounted on the end plate 128, the latter being apertured to accommodate the chain. The other run of the chain 153 is received through a suitable aperture 162 in the end plate 128 and is carried on a roller bearing 163 rotatably mounted by means of bearing bracket 164 secured on the end plate 128 below the aperture 162. The plate 127 at the other end of the carriage 20 is cut away at the bottom to accommodate the two runs of the drive chain 153 and to provide clearance for other members. The chain drive is automatically controlled, in a manner which will be described subsequently, to move the carriage 20 in the linear direction during the deposit of the twisted links in the rotating cylinder 19. A cable, belt or similar device may be employed in place of the chain drive.

The final linear movement of the carriage 20 which occurs at the end of the linking operation and which carries the carriage 20 to the end of the machine in position for removal of the coil of links is accomplished by hydraulic mechanism which comprises an hydraulic cylinder 169, which is secured at one end to the inner plate member 28 of the end support casing 12 and which is provided with an operating piston 170. The free end of the piston 170 is connected to the carriage 20 by four rods or bars 171 which are each connected at one end to the end plate 128 and at the other end to a cross plate 172 secured on the end of the piston 170. The cylinder 169 is extended a substantial distance from the end support casing 12 towards the other end of the machine in order to get the necessary length of stroke for operating the carriage 20. The carriage end plates 127 and 128 are properly apertured or cut away to clear the cylinder 169 upon movement of the carriage 20. An intermediate support 173 in the form of an inverted generally triangular shaped cross plate or frame structure extends upwardly of the base member 11 and is secured to the cylinder 169 and also to guide rods 134 and 135, being suitably apertured to accommodate the chain 153.

One of the connecting rod members 171 carries a cam plate 174 which is adapted to engage with a switch actuating pin 175 projecting upwardly at the end of the support plate 11 of the machine and in the path of movement of the cam plate 174 which forms part of the automatic control system. The hydraulic cylinder 169 is provided with suitable fluid connections 176 (Fig. 4) at its head end and 177 at its rod end (Fig. 1) for connecting the cylinder 169 into an hydraulic line with relay operated control valves 178 and 179, respectively (Figs. 14 and 16).

Figure 13:
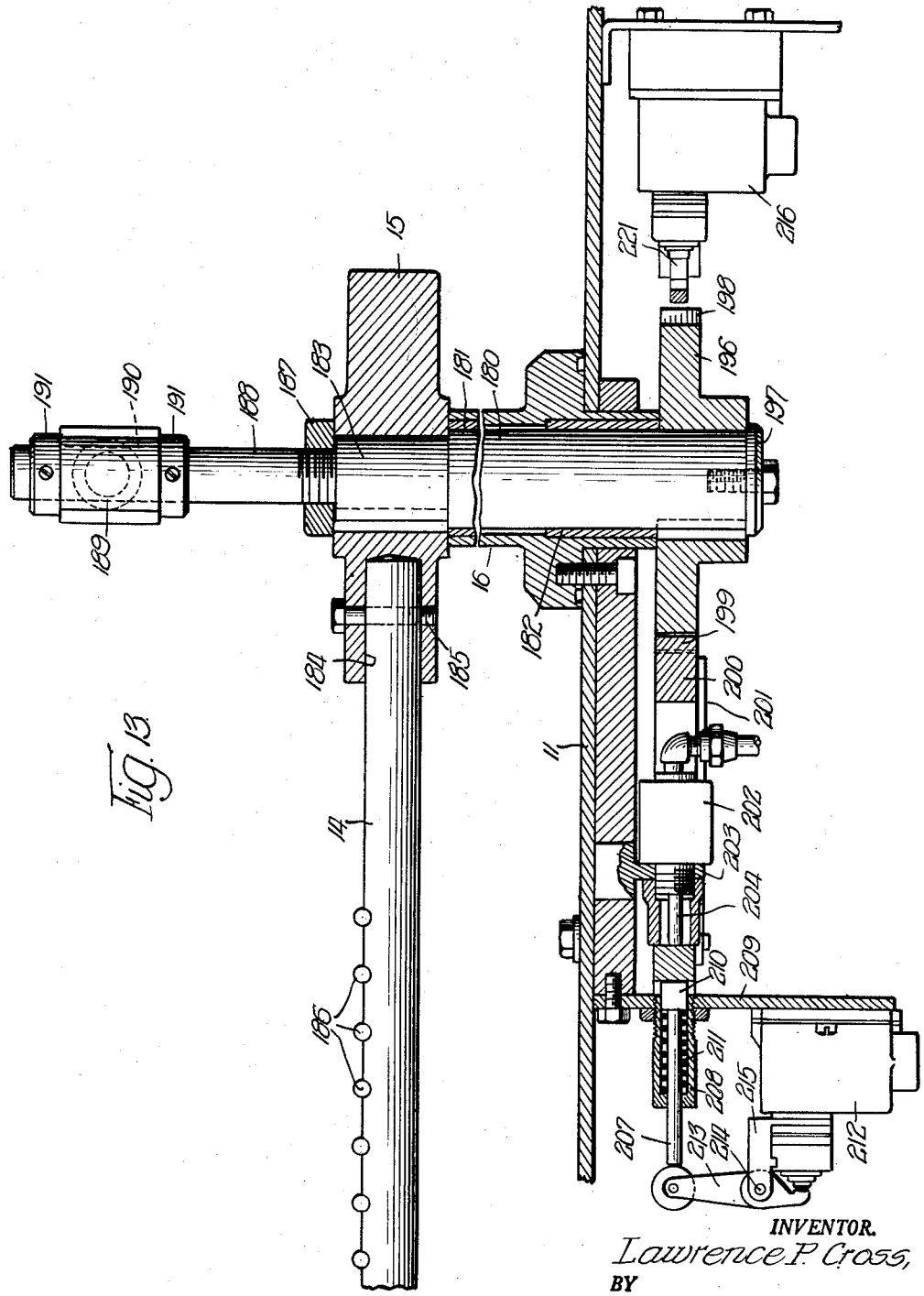
Fig. 13 is a section taken on the line 13—13 of Fig. 12.

At the discharge end of the machine the capstan or turret arrangement 13 for supporting the coil receiving or supporting bars or rods 14 comprises the upright hollow supporting post 16 (Figs. 12 and 13) which is secured to the base plate 11 and in which there is journaled a vertical shaft by means of upper and lower bearing sleeves 181 and 182. Adjacent its upper end the shaft 180 has a reduced top portion 183 on which there is keyed the rod supporting hub 15 which receives in apertures 184, spaced around the periphery thereof, the four coil supporting bars or rods 14. Each of the support bars 14 is secured in its aperture 184 by a cross pin 185. Each of the support bars 14 is provided on the top edge with longitudinally spaced cross bar members 186 for receiving therebetween, in properly spaced relation on the bar, the coils of completed links. The hub 15 is held on the vertical shaft 180 by a lock nut 187 which is secured in threaded relation on a further reduced portion 188 of the shaft which extends above the hub 15.

The upper end portion 188 of the vertical shaft receives thereon a bearing bracket 189, with the shaft portion 188 extending through a vertical bore 190 in the bracket and with the bracket 189 held in position thereon by vertically spaced collars 191. The bracket 189 is apertured to receive the reduced end of a brace rod 192 which extends longitudinally of the machine and which is secured to the bracket 189 by connecting pin 193. At its other end the brace rod 192 is secured to the top portion of a vertical post member 194 on the top of the end support casing 12. The brace rod 192 serves as a brace for the capstan arrangement and also as a top guide rod for the carriage 20 which is provided with apertured guideway forming members 195, secured at opposite ends of the top plate 126, for receiving the brace rod 192 and connecting the carriage in sliding relation therewith.

At the lower end the shaft 180 is provided with an indexing plate or disk member 196 which is secured below the support member 11 in fixed relation on the end of shaft 180 by a cap screw 197 and which is provided around its peripheral edge with spaced inwardly extending radial slots 198 adapted to receive a cooperating locking projection 199 on the end of a sliding lock or latch plate member 200 which is mounted in a suitable guideway formation 201 on the bottom face of the base plate 11. The lock plate 200 is controlled by means of an hydraulic cylinder 202 which is mounted on a depending bracket 203 and arranged so that the plunger 204 thereof engages within a central aperture 205 in the latch plate 200 and when extended withdraws the latch element 199 from engagement in the aperture 198. The hydraulic cylinder 202 is connected into the hydraulic line through a control valve 206 (Fig. 15). The latch plate 200 is normally urged into latching engagement with the indexing plate 196 by a plunger member 207 which is mounted in a cylinder 208 supported on and extending through an aperture in a depending bracket plate 209 and having its inner head end 210 engaged with the outer end of the latch plate 200 and normally urged into engagement therewith by a compression spring 211.

The spring pressed pin 207 also functions to operate a safety switch 212 mounted on the bracket 209 by engaging the outer end of a lever 213 which is pivoted intermediate its ends at 214 on a supporting bracket member 215 extending from the switch casing 212, with its other end engaging the operating button for the switch 212. The safety switch 212 forms part of the electrical control system and prevents operation of the dividing and twisting mechanism until a coil receiving bar 14 has been indexed into proper position or alignment relative to the carriage 20 to receive the coil of finished links from the cylinder 19 at the end of the twisting and accumulating operation.

The indexing plate 196 on the bottom of the shaft 180 also controls the operation of a turret index switch 216, which is secured to the base 10. A bell crank having an arm 217 carrying a cam roller 218 which engages with the periphery of the index plate 196 is pivoted at 219 to a support 220 which extends from the switch 216 and its other arm 221 engages the switch button on the switch 216 and holds the switch 216 in open position. When the plate 196 is rotated and cam roller 218 drops into a peripheral slot 198 the switch button is released and the switch 216 is closed. While the shaft 180 is held against rotation by the latch element 199 as in Fig. 12 the switch 216 is held in the open position. When the latch element 199 is withdrawn from the slot 198 the shaft 180 may be rotated 90° and the switch 216 will be momentarily closed as the roller 218 drops into the slot 198 and immediately reopened by continued rotation of the index plate 196 to position a bar 14 in proper alignment for receiving the coiled links from the accumulating cylinder 19. The momentary closing of the turret index switch 216 operates part of the automatic control system in a manner which will be explained.

The movements of the carriage 20 are utilized in operating part of the automatic control system. The cam plate 174 which is mounted on the rod 171 of the hydraulic operating mechanism for the carriage 20 and which is positioned so that its lower edge engages the switch operating pin or plunger 175 at the end of the linear movement of the carriage 20 has a leading cam forming edge portion 222 which first engages and depresses the pin 175 and a trailing cam edge portion 223 which is engaged with the pin 175 at the limit of the forward movement of the carriage 20 and which further depresses the pin 175. The pin 175 (Fig. 14) is mounted in a vertically extending tubular casing 224 and is normally urged in the upward direction by a compression spring 225 within the casing 224, the pin having a button forming head portion projecting above the casing 224 for engagement with the cam plate 174. The pin 175 carries at its lower end a cross plate 226 having switch operating members 227 and 228 adjacent opposite ends thereof. Upon depression of the pin 175 by engagement therewith of the leading cam edge portion 222 on the plate 174 the member 227 engages the free end of a switch operating lever arm 229 which is pivotally mounted intermediate its ends at 230 on a projecting bracket member 231 extending from the casing of a motor brake operating switch 232. The switch 232 is supported on a mounting plate 233 secured beneath the base member 11. The switch 232 is normally open and the motor brake 234 (Fig. 4), which it controls, is normally off. When the switch 232 is closed as the carriage 20 approaches the turret 13 the brake 234 is actuated to stop the rotation of the cylinder 19. Upon engagement of the cam edge portion 223 with the pin 175 the latter is further depressed to engage the member 228 with the free end of a switch operating arm 235 which is pivoted intermediate its ends at 236 on a bracket 237 extending from the casing of a carriage reversing switch 238 which is mounted on the support plate 233. The switch 238 is normally open and is closed by engagement of the end of the pivoted arm 234 with the switch button upon depression of pin 175 by engagement of the latter with cam edge 223. The switch 238 operates through relays B and C (Fig. 14) to automatically reverse the direction of movement of the carriage 20 when it reaches the end of its travel toward the turret end of the machine, where it deposits the coil of twisted links on one of the support rods 14.

At the other end of the machine a head end switch 239 (Figs. 3 and 15) is mounted in the transmission housing 12 which is normally in the open position but which is closed when the carriage 20 moves to the starting position immediately adjacent the housing 12. The switch 239 is operated by a bell crank 240 pivoted at 241 to a bracket 242 in the casing 12 which bell crank has one arm engaging the switch button and the other arm engaging a spring pressed plunger 243. The plunger 243 is mounted in a suitable housing 244 extending through the inner wall member 28 of the transmission housing 12 and urged by compression spring 245 away from the arm of the bell crank 240. The other end of the plunger 243 projects into the path of an abutment member 246 secured on the end wall 127 of the carriage 20. Movement of the carriage 20 toward the turret end of the machine opens the switch 239 which remains open until the carriage 20 is returned to its initial starting position. The switch 239 controls the operation of the valve 206 and cylinder 202 (Figs. 13 and 14) so that the turret can not be indexed when the switch 239 is open.

A spray nozzle 247 is provided at the entrance end of the dividing conveyors 41 and 42 and connected to a water line which is also connected at 248 to the housing 115 to provide water lubrication for the bearing 116'. The water line includes a pressure operated switch 249 (Fig. 4) which opens upon a predetermined drop in the water pressure and stops the operation of the machine.

The machine is operated and automatically controlled by suitable electrical equipment which is diagrammatically illustrated in Fig. 16 and which includes a starter switch 250 located in the transmission housing 12 at the head end of the machine (Fig. 3) and other necessary equipment which is conveniently located in the base 10 of the machine.

Before starting the machine the hydraulic system is connected to the necessary air line or other fluid supply and the water line is connected to a water supply line. The air line provides air for operation of the cylinder 169 through the solenoid valves 178 and 179 which control the delivery of air to the connections 176 (Fig. 4) and 177 (Fig. 1), respectively, at the head end and at the rod end of the cylinder 165. Air is also supplied through the solenoid valve 206 to the turret locking cylinder 202. The valves 178, 179 and 202 are all normally closed.

Power is supplied by means of a 220/440 volt power line (Fig. 16) to the motor starter or relay A and to the transformer 260 which supplies 110 volts A. C. to the main operating circuit and 90 volts D. C. to a secondary circuit through the rectifier 261, the latter controlling the operation of the motor brake 234 and the clutch 159 (Fig. 4) through operation of brake switch 232 (Fig. 14) and contact $a1$ of relay A which energizes and de-energizes clutch 159. Before starting the machine the water pressure switch 249 must be closed by pressure in the control valve. When the starter switch 250 is closed the turret is unlocked by operation of the valve 206 and cylinder 202 and the turret safety switch 212 is opened. The rod end valve 170 opens and the cylinder 169 holds the carriage 20 at the end of the machine adjacent the transmission housing 12 where the pin 229 holds the feed controlled switch 36 out of its normal position. Before the stuffed casing 21 is fed to the divider mechanism 17 the turret 13 is indexed to position one of the support rods 14, as in Fig. 1, for receiving the coil of finished links from the accumulating cylinder 19 at the end of the linear movement of the latter. Rotating the turret 13 more than 45° momentarily closes the turret index switch 216, which is normally open, and energizes relay C. When relay C S. P. D. T. contact $c$ transfers it releases the turret locking plunger 199 through operation of valve 206 and cylinder 202 so that the turret will lock when rotated to the 90° position. Relay C is held energized through its own contact $c$ and the normally closed carriage reversing switch 238. When the locking plunger 199 is in position to lock the turret 13 against further rotation the turret safety switch 212 is in its normally closed position.

With a support rod 14 in proper position and the turret 13 locked the machine is ready for insertion of the stuffed casing 21 through the feed tube 22 (Fig. 8) which raises the feed control plate 24 and causes the pin 29 to operate the S. P. D. T. feed controlled switch 36 which energizes relays A and B and de-energizes the control for the rod end valve which releases the carriage for linear movement by operation of the drive chain 153. One of the contacts $a1$ of relay A energizes the clutch 159 which couples the chain 153 to the motor drive while the remaining contacts $a2$, $a3$ and $a4$ start the motor. Energizing relay B causes S. P. D. T. contact $b1$ to transfer from its normal closed position to operate the head end valve 178 supplying air to the head end of the cylinder 169 when the switch 36 transfers back to its normal position, at the end of the feeding of the length of casing 21. Make before break relay contact $b2$ transfers so that relay B will remain energized when the switch 36 transfers back to its normal position. When the carriage 20 moves away from the transmission casing 12 the head end switch 239 opens and the turret can not be unlocked until the carriage 20 returns to its initial starting position and closes head end switch 239.

The conveyors 41 and 42 feed the casing through the twisting and distributing head 18 and simultaneously divide the casing into link forming sections of uniform length. The link sections pass through the rapidly rotating head 18 and are rotated about their axis to place one or more twists in the casing separating the links. The twisted links are caused to deposit themselves in single coil formation on the inner wall of the cylinder 19 which is rapidly rotating within the carriage 20. The carriage 20 is moved at a relatively slow rate of speed toward the turret end of the machine by the chain 153 while the link twisting operations occur.

When the trailing end of the casing 21 passes through the dividing mechanism 17 the control plate 24 drops and the switch 36 is operated with the switch contact transferring back to its initial position, de-energizing relay A, which removes power from the motor 99 and de-energizes the clutch 159 releasing the drive chain 153 and simultaneously operates the control valve 178 for the carriage moving cylinder 169 to admit air to the head end of the cylinder and take over movement of the carriage 20 toward the turret 13.

Upon movement of carriage 20 to engage the cam edge 222 with the switch operating pin 175 the brake switch 232 is closed to actuate the brake 234 and bring the entire mechanical drive to a stop. When the cylinder 19 slows down or stops its rotative movement the coil of twisted links, which is held against the internal surface of the cylinder by centrifugal force, collapses and is deposited on the supporting rod 14 which extends into the cylinder 19. The final linear movement of the carriage 20 engages the cam edge 223 with the switch operating pin 175 and the normally closed reversing switch 238 is opened. This de-energizes relays B and C. When the relay contact $b1$ transfers the valves 178 and 179 are operated to reverse the air in the cylinder 165 and reverse the movement of the carriage 20 to carry it back toward the other end of the machine. This occurs after the rotation of the cylinder 19 is stopped or slowed down, by operation of the motor brake 234, sufficiently to allow the coil of links to collapse onto the support rod 14.

As the reverse movement of the carriage 20 begins the reversing switch 238 returns to its normally closed position and the brake switch 232 opens to release the motor drive. Contact $c$ of relay C also returns to its normal position (Fig. 16) when the carriage 20 reaches its initial starting position adjacent the transmission housing 12 while the head end switch 239 is actuated to operate the turret locking valve 206 and cylinder 202 to release the turret for rotation to position an empty support rod 14 for the next cycle of operation. The mechanism is reset in the manner described upon rotating the turret 13 to properly position the next support bar 14 and thereafter the next length of casing may be fed through the feed tube 22 and the operating cycle repeated.

While specific materials and particular details of construction are referred to in describing the illustrated form of the invention it will be understood that other materials and other details of construction may be resorted to within the spirit of the invention.

I claim:

1. In a sausage linking machine a supporting frame structure, means on said frame structure for advancing a filled sausage casing of predetermined length and for constricting the casing at intervals to divide the same into individual links, an open ended tube-like container rotatably mounted on said frame structure adjacent to and aligned with said casing advancing and constricting means for receiving the connected links therein, means connected to said container for rotating said container about its longitudinal axis and at a relatively high rate of speed, means on said frame structure between said casing constricting means and said container and cooperating with said constricting means to impart a twist between each link and the next succeeding link and to cause said links to advance into said container, means connected to said container for moving said container at a relatively slow rate of speed in the direction of its axis of rotation while said links are advancing therein to arrange the links in a single coil formation, and control means connected to said container rotating means and said container moving means, which control means has an actuating member operated by the passage of the sausage casing to start and stop the rotation and axial movement of said container.

2. In a sausage linking machine a supporting frame structure, means on said frame structure for guiding a filled sausage casing along a predetermined path and for constricting the casing at intervals to divide the same into individual links of predetermined length, an open ended container mounted on said frame structure and extending forwardly of said casing constricting means in the direction of the travel of the casing for receiving the connected links, means connected to said container for rapidly rotating said container about its longitudinal axis, means mounted between said casing constricting means and said container for guiding said links into said container and for imparting a twist between each link and the next succeeding link, means connected to said container for moving the same in a lineal direction along its axis of rotation in timed relation to operation of said casing constricting means whereby to cause said links to arrange themselves in open coil formation within said container, link supporting means on said frame structure along the path of lineal movement of said container for receiving the coil of links from said container, said link supporting means being arranged in alignment with said container and extending into the same when said container moves to a predetermined position and its rotation is discontinued whereby to receive thereon the open coil of links, and control means including an actuating member operated by movement of the sausage casing past the same for automatically starting and stopping the rotation of said container and for controlling the lineal movement of said container.

3. In a linking machine a supporting frame structure, means on said frame structure for advancing a length of filled casing and for constricting the same at intervals to divide the casing into successive individual links of predetermined length, an open ended tube-like link accumulating container mounted on said frame structure adjacent said casing constricting means, means connected with said container for rotating said container about its longitudinal axis, means operatively connecting said container for moving said container in a predetermined lineal path along its axis of rotation in timed relation to the speed of rotation, means on said frame structure adjacent said casing constricting means and cooperating with said casing constricting means and said container for imparting a twist between each link and the next succeeding link and for causing the twisted links to arrange themselves in an open coil on the inner wall of said container, a movable supporting bar mounted on said frame in a position to extend into said container and within said coil of links when said container reaches the end of its lineal movement whereby to automatically receive in supported relation thereon the coil of links when said container ceases its rotational movement, and control means connected to said container rotating and moving means which control means is actuated by the initial feeding movement of the casing to start the rotation and movement of said container and to stop the rotation and movement of said container when the linking of the length of casing is completed.

4. In a sausage linking machine a supporting frame structure, means on said frame structure for continuously advancing a filled sausage casing and for constricting the casing at intervals to divide the same into successive links of predetermined length, a cylindrical container rotatably mounted on said frame structure for lineal movement in the direction of its axis of rotation, said container being initially positioned with an end portion of said casing constricting means projecting within the same for depositing therein the connected links, means operatively connected to said container for rapidly rotating said container about its axis, mechanism rotatably mounted on said frame structure adjacent said end of said casing constricting means and cooperating with said casing constricting means and said container for imparting a twist in the casing area between successive links and for delivering the twisted links into said container, means operatively connected to said container for imparting a relatively slow lineal movement of said container in the direction of advancing movement of the links and away from said twisting mechanism to cause the links to be delivered in an open single coil formation within said container, and control means for said container rotating and moving means, which control means is actuated by the sausage casing during its movement along said path to start and stop the rotation and linear movement of said container in timed relation to the starting and stopping of the dividing and twisting operation on said casing.

5. In a sausage linking machine a supporting frame structure, means on said frame structure for continuously advancing a filled sausage casing in a predetermined path and for constricting the casing at intervals to divide the casing into individual links of predetermined length, an open ended tube-like container for receiving the connected links, said container being mounted on said frame structure and spaced forwardly of the end of said casing constricting means in the direction of the advancing movement of the connected links, means operatively connected to said container for rotating said container about its longitudinal axis, means operatively connected to said container for moving said container in a linear path along its axis of rotation while it is rotating, and twisting and distributing means mounted on said frame structure between said casing constricting means and said container and cooperating with said constricting means and said container to impart a twist between each link and the next succeeding link and to cause the links to be deposited in a coil in said container, said twisting and distributing means comprising a rapidly rotating throat ring and a hollow distributing tube secured thereto in communication with said throat ring, said throat ring being mounted on said frame structure for rotation about an axis substantially coinciding with the axis of rotation of said container and said distributing tube extending therefrom at an angle relative to said axis, and means for controlling the container rotating means and the container moving means which control means comprises a control device operated by passage of the filled sausage casing into said advancing and constricting means and a second control device operated by said container at the end of its linear movement.

6. In a sausage linking machine, a supporting frame structure, means on one end of said frame structure for continuously feeding a filled sausage casing in a predetermined path and for dividing the same into successive individual links of predetermined length, a cylindrical container mounted on said frame structure for movement in a predetermined lineal path toward and from said casing feeding and dividing means, means operatively associated with said container for rapidly rotating said container about its cylindrical axis, twisting and distributing mechanism mounted on said frame structure and positioned initially adjacent one end of said container for cooperating with said casing feeding and dividing means and said container to impart a twist in the area between successive links and to deliver the twisted links into said container as it rotates, means connected to said container for moving the container in a lineal path along its axis of rotation simultaneously with the rotation thereof whereby the links are deposited in a single open coil formation therein, a turret structure at the other end of said frame structure adjacent the end of the lineal path of movement of said container, a plurality of bars movably mounted on said turret structure, said bars being adapted to be successively positioned to extend into the open coil of connected links within said container and receive the same in looped arrangement thereon when said container reaches the end of its lineal movement, control means connected to said container rotating means and said container moving means, which control means is operative in response to predetermined movement of said bars to disconnect said control means and prevent rotation and movement of said container until one of the bars has been properly positioned to extend into the open coil of links when said container reaches the end of its lineal movement.

7. In a machine for forming a length of stuffed casing into a plurality of short connected links, means for dividing the casing into portions of uniform length and for constricting the casing between the divided portions to form successive links, a cylindrical receptacle rotatably mounted adjacent said dividing and constricting means for accumulating the connected links therein, means cooperating with said dividing and constricting means and with said receptacle for imparting a twist in the constricted casing between each link and the next succeeding link and for delivering the successive links into said receptacle, through one end thereof, means connected to said container and said twist imparting means for rapidly rotating said receptacle and for moving said receptacle and said twist imparting means relative to each other to cause the links to arrange themselves in an open coil about the inner periphery of the container and remain in such position under centrifugal force, a member mounted adjacent the other end of the receptacle for removing the coil of links from said other end of said receptacle, and means connected to said receptacle and said member for moving said member and said receptacle relative to each other to position said member within the coil of links while said receptacle is rotating and said links are being formed whereby to deposit the coil of links in suspended relation on said member when the rotation of said receptacle is discontinued, and control means connected to said receptacle, said twist imparting means and said coil removing means for automatically starting and stopping the rotation of said receptacle and the relative movement of said receptacle and said twist imparting means and said coil removing means which control means is actuated by movements of the casing to start and stop the rotation and relative movement of said receptacle, whereby the length of casing is automatically divided into links, the links are twisted and accumulated in a coil and thereafter deposited on said coil removing member.

8. In a sausage linking machine, a supporting frame structure, means on said frame structure for continuously feeding a filled sausage casing in a horizontal path and for dividing the same into successive individual links of predetermined length, a cylindrical container mounted on said frame structure with its cylindrical axis aligned with said casing feeding and dividing means, means operatively associated with said container for rapidly rotating said container about its cylindrical axis, twisting and distributing mechanism mounted on said frame structure and positioned initially adjacent one end of said container for cooperating with said casing feeding and dividing means and said container to impart a twist in the area between successive links and to deliver the twisted links into said container as it rotates, means connected to said container for moving the container along its lineal path simultaneously with the rotation thereof whereby the links are deposited in a single open coil formation therein, a plurality of bars movably mounted on said structure at the end of the path of lineal movement of said container, said bars being adapted to be selectively positioned to extend into the open coil of connected links within the container and receive the same in looped arrangement thereon when said container reaches the end of its lineal movement, and control means connected to said container rotating means and said container moving means, which control means is actuated by said bars whereby to disconnect said control means and prevent rotation and movement of said container until one of the bars has been properly positioned to extend into the open coil of links when said container reaches the end of its lineal movement.

9. In a sausage linking machine, a supporting frame structure having thereon means for feeding a length of filled sausage casing in a predetermined path, and for constricting the casing at intervals to divide the same into successive individual links of predetermined length, an open ended container mounted on said frame structure and positioned adjacent said casing feeding and constricting means for receiving the connected links therefrom, means operatively connected to said container for rotating said container about its longitudinal axis, means operatively connected to said container for moving said container in a predetermined lineal path along its axis of rotation, means mounted on said frame structure and cooperating with said casing constricting means and said container for imparting a twist between each link and the next succeeding link and for causing the links to be deposited in coil formation in said container, a link receiving structure mounted on said frame structure adjacent the end of the path of lineal movement of said container comprising a rotatable post having mounted thereon in radially extending peripheral spaced relation a plurality of link supporting bars, said post being rotatable to position the bars selectively to extend into the container when the container reaches the end of its lineal movement and to receive thereon the coil of links when the container ceases its rotational movement, a locking member associated with said post for selectively locking the post against rotation, the successive bars being adapted to be properly positioned when the post is locked against rotation to receive the links from said container, control means connected with said container for starting and stopping the rotation and lineal movement of the container, and means interconnecting said locking member with said control means whereby to permit rotation and lineal movement of said container only when one of said bars is in proper position to receive the coil of links thereon.

10. In a machine for forming a length of stuffed casing into a plurality of connected links, a supporting frame structure, means on said frame structure for feeding a stuffed casing in a predetermined path and for constricting the casing at intervals to divide the same into individual links of predetermined length, a container mounted for rotation about its longitudinal axis on said frame structure adjacent said feeding and constricting means, a throat member aligned with said casing feeding and constricting means and forming a small unobstructed passageway into said container adjacent the axis of rotation thereof which passageway is larger in diameter than the casing whereby to permit the casing to pass without interruption therethrough into the container, said throat member being spaced from said feeding and constricting means a distance less than the length of a link for receiving successively the connected links from the feeding and constricting means, said throat member having on its internal surface and adjacent the entrance thereto relatively short closely spaced rib formations which extend inwardly and axially of the passageway formed by said throat member, and means operatively connected to said container for rotating said container at a high rate of speed whereby the links are urged outwardly of the axis of rotation and axially rotated to impart a twist in the constricted area between each link and the next succeeding link while said links are moving freely through said throat member into said container.

11. In a sausage linking machine, a supporting frame structure, means on said frame structure for continuously feeding a filled sausage casing in a predetermined path, means mounted on said frame structure adjacent said casing feeding means for constricting the same at intervals to divide the casing into individual links of predetermined length, a container mounted on said frame structure and positioned adjacent said casing constricting means for receiving the connected links therefrom, means operatively connected with said container for rotating said container about its longitudinal axis, means operatively connected with said container for moving said container along its axis of rotation, and means arranged on said supporting frame for cooperation with said casing constricting means and said container to impart a twist between each link and the next succeeding link and to deposit the links in coil formation in said container, said last mentioned means comprising a throat ring rotatably mounted on said frame structure and a hollow distributor member connected to said throat ring, said throat ring and said distributor member forming a passageway having the leading portion thereof extending at an angle to the axis of rotation of said throat ring and providing an angled path for the links from said casing constricting means to said container, and circumferentially spaced axially and inwardly extending rib formations on the inner side of said passageway.

12. In a sausage linking machine, a supporting frame structure, means on said frame structure for continuously feeding a filled sausage casing in a predetermined path, casing constricting members cooperating with said casing feeding means to engage the casing at intervals and divide the same into individual links of predetermined length, a tubular container rotatably mounted on said frame structure adjacent said casing constricting members to receive the connected links, means operatively connected with said container for rapidly rotating said container about its axis, and twisting and distributing mechanism rotatably mounted on said frame structure adjacent one end of said container and said casing constricting members for cooperation with said container and said constricting members to impart a twist in the area between each link and the next succeeding link and to deposit the twisted links in coil formation on the internal surface of said container, said container having a plurality of spaced axially and inwardly extending rib formations on the internal surface thereof for restraining the links against shifting movement relative to said surface.

13. In a machine for forming a length of stuffed casing into short serially connected links, a supporting frame structure, an upstanding support member at one end of said frame structure, a supporting bracket extending horizontally from said upstanding support member, means on said supporting bracket for continuously advancing the stuffed casing along a horizontal path and for simultaneously constricting the casing at longitudinally spaced intervals to divide the same into individual links of predetermined length, a cylindrical container, a carriage on said frame structure for supporting said container for rotation about its longitudinal axis and for reciprocable linear movement in a horizontal path in the direction of its axis of rotation, means operatively connected with said container for rapidly rotating said container about its axis, means connected to said carriage for simultaneously advancing the same relatively slowly in the direction of the axis of rotation of said container, said supporting bracket having a free end and means on the free end of said supporting bracket for guiding the links from the casing dividing means into said container, said container being of a diameter to encompass said supporting bracket and said casing dividing means when in an initial position adjacent said upstanding support member, an upright post formation at the other end of said supporting frame structure, a hub rotatably mounted on said post, a plurality of radially extending elongate supporting bars on said hub, a device for locking said hub in fixed position when one of said supporting bars is positioned to extend into said container at the end of its advancing movement, control means connected to said locking device and means on the ends of said carriage for actuating said control means when said carriage is at the end of its lineal movement.

14. In a machine for forming a length of stuffed casing into short serially connected links, a horiontal supporting frame structure, an upstanding support member at one end of said frame structure, a supporting bracket extending horizontally from said upstanding support member, means on said supporting bracket for continuously advancing the stuffed casing along a horizontal path and for simultaneously constricting the casing at longitudinally spaced intervals to divide the same into individual links of predetermined length, a cylindrical container, a carriage on said frame structure for supporting said container for rotation about its longitudinal axis and for reciprocable linear movement in a horizontal path in the direction of its axis of rotation, means operatively connected with said container for rapidly rotating said container about its axis, means connected to said carriage for simultaneously advancing the same relatively slowly in the direction of the axis of rotation of said container, said supporting bracket having a free end and means on the free end thereof for guiding the links from the casing dividing means into said container, said container being of a diameter to encompass said supporting bracket and said casing dividing means when in its initial position adjacent said upstanding support member, an upright post formation at the other end of said supporting frame structure, a hub rotatably mounted on said post, a plurality of radially extending elongate supporting bars on said hub, a device associated with said hub for locking said hub in fixed position when one of said supporting bars is positioned to extend into said container at the end of its advancing movement, interlocking control means having actuating members mounted adjacent said supporting post and on said upstanding support member for preventing operation of said casing dividing means and said cylinder when said hub locking device is unlocked, and said carriage having members thereon for engaging said actuating members when said carriage moves to the ends of its linear path.

15. In a machine for forming a length of stuffed casing into a plurality of short connected links, means for dividing the casing into portions of uniform length and for constricting the casing between the divided portions to form successive links, a cylindrical receptacle rotatably mounted adjacent said dividing and constricting means for accumulating the connected links therein, means cooperating with said dividing and constricting means and with said receptacle for imparting a twist in the constricted casing between each link and the next succeeding link and for delivering the successive links into said receptacle through one end thereof, means connected to said receptacle for rapidly rotating said receptacle and for moving said receptacle and said twist imparting means relative to each other to cause the links to arrange themselves in an open coil about the inner periphery of the container and remain in such position under centrifugal force, a plurality of elongate supporting bars for receiving successive coils of links from said container, a hub, said bars being mounted in fixed radially extending relation on said hub, an upstanding post formation at the other end of the machine, said hub being rotatably mounted thereon and a locking mechanism connected to said hub for automatically locking said hub against rotation when one of said bars is in position to extend into the rapidly rotating cylinder at the end of the movement of said cylinder.

16. In a linking mechanism, an elongate supporting frame, means at one end of the supporting frame for advancing a stuffed casing in a predetermined path toward the other end of the supporting frame, means associated with said casing advancing means for dividing the casing into successive links as the casing advances, a support member extending transversely of the supporting frame adjacent the dividing means and having a relatively small opening therein forming a passageway for receiving the links therethrough, a rotatable throat member mounted in said opening and having an axially and radially directed passageway for the links, a cylindrical open-ended container, a carriage on the supporting frame for mounting said container for rotatable movement about its longitudinal axis, said axis extending in the direction of the advancing movement of the casing, said carriage being movable toward and from said throat member and a predetermined position at the other end of said supporting frame, means mounted at the other end of said supporting frame for receiving the links from said container when it is moved to said predetermined position, means connected with said container for rapidly rotating said container about its longitudinal axis, and a power driven endless chain connected to said carriage for moving said carriage from an initial position where the rotatable throat member is adjacent the one end thereof towards the other end of the supporting frame with a relatively slow movement until the throat member is adjacent the other end of the container.

17. In a sausage linking mechanism, an elongate supporting frame, means at one end of the supporting frame for advancing the stuffed sausage casing in a predetermined path toward the other end of the supporting frame and for dividing the casing into successive links as the casing advances, a rotatable throat member mounted at the end of said casing advancing and dividing means and having an axially and radially directed passageway for the links, a cylindrical open-ended container for receiving the links in coil formation therein, a carriage on the supporting frame for mounting said container for rotatable movement about its longitudinal axis, said axis extending in the direction of the advancing movement of the casing, said carriage being movable toward and from a predetermined position at the other end of said supporting frame, means mounted at the other end of said supporting frame and aligned with said container for receiving the links from said container when it is moved to said predetermined position, drive means connected to said container for rapidly rotating said container about its longitudinal axis, a power driven endless cable connected to said carriage for moving said carriage from an initial position where the rotatable throat member is adjacent the one end thereof towards the other end of the supporting frame with a relatively slow movement until the throat member is adjacent the other end of the container, and an hydraulic cylinder connected to said carriage which is operable to move said carriage to the other end of said supporting frame.

18. In a sausage linking mechanism, an elongate supporting frame, means at one end of the supporting frame for advancing the stuffed sausage casing in a predetermined path toward the other end of the supporting frame and for dividing the casing into successive links as the casing advances, a rotatable throat member mounted at the end of said casing advancing and dividing means and having an axially and radially directed passageway for the links, a cylindrical open-ended container for receiving the links in coil formation therein, a movable carriage on the supporting frame for mounting said container for rotatable movement about its longitudinal axis, said axis extending in the direction of the advancing movement of the casing, said carriage being movable toward and from a predetermined position at the other end of said supporting frame, means at the other end of said supporting frame for receiving the links from said container when it is moved to said predetermined position, means connected to said container for rapidly rotating said container about its longitudinal axis, a power driven endless cable mechanism connected to said carriage and said supporting frame for moving said carriage from an initial position where the rotatable throat member is adjacent the one end thereof towards the other end of the supporting frame with a relatively slow movement until the throat member is adjacent the other end of the container, and an hydraulic mechanism connected to said carriage for moving said carriage the remainder of the distance to the other end of said supporting frame and for returning said carriage to its initial position.

19. In a sausage linking mechanism, an elongate supporting frame, means at one end of the supporting frame for advancing the stuffed sausage casing in a predetermined path toward the other end of the supporting frame and for dividing the casing into successive links as the casing advances, a rotatable throat member mounted at the end of said casing advancing and dividing means and having an axially and radially directed passageway for the links, a cylindrical open-ended container for receiving the links in coil formation therein, a carriage on the supporting frame for mounting said container for rotatable movement about its longitudinal axis, said axis extending in the direction of the advancing movement of the casing, said carriage being mounted for reciprocating movement toward and from a predetermined position at the other end of said supporting frame, means mounted at the other end of said supporting frame for receiving the links from said container when it is moved to said predetermined position, means connected to said container for rapidly rotating said container about its longitudinal axis, a power driven endless cable connected to said carriage for moving said carriage from an initial position where the rotatable throat member is adjacent the one end thereof towards the other end of the supporting frame with a relatively slow movement during the delivery of the links therein, and hydraulic mechanism connected to said carriage for thereafter moving the carriage to said predetermined position at the other end of said supporting frame and for returning said carriage to its initial position.

References Cited in the file of this patent

UNITED STATES PATENTS

| 1,545,586 | Kruse | July 14, 1925 |
| 2,307,361 | Demarest et al. | Jan. 5, 1943 |
| 2,641,798 | Anderson | June 16, 1953 |

FOREIGN PATENTS

| 20,096 | Great Britain | 1912 |